United States Patent
Ramachandran

(10) Patent No.: US 9,071,940 B2
(45) Date of Patent: *Jun. 30, 2015

(54) SYSTEMS, METHODS, AND COMPUTER PROGRAM PRODUCTS FOR ESTIMATING CROWD SIZES USING INFORMATION COLLECTED FROM MOBILE DEVICES IN A WIRELESS COMMUNICATIONS NETWORK

(71) Applicant: AT&T Intellectual Property I, L.P., Atlanta, GA (US)

(72) Inventor: Jayaraman Ramachandran, Plainsboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/857,163

(22) Filed: Apr. 5, 2013

(65) Prior Publication Data

US 2013/0226543 A1 Aug. 29, 2013

Related U.S. Application Data

(63) Continuation of application No. 12/791,463, filed on Jun. 1, 2010, now Pat. No. 8,442,807.

(51) Int. Cl.
G06F 17/10 (2006.01)
H04W 4/02 (2009.01)

(52) U.S. Cl.
CPC ............... *H04W 4/025* (2013.01); *H04W 4/02* (2013.01); *H04W 4/022* (2013.01); *H04W 4/028* (2013.01)

(58) Field of Classification Search
USPC .......................................................... 703/6
See application file for complete search history.

(56) References Cited

U.S. PATENT DOCUMENTS

| 6,400,813 | B1 | 6/2002 | Birnhak |
| 8,442,807 | B2 * | 5/2013 | Ramachandran ................ 703/2 |
| 2010/0041391 | A1 | 2/2010 | Spivey et al. |

OTHER PUBLICATIONS

El-Baz, Farouk, "The (?)-Man March—Crowd Space: Bodies Count", Http://www.wired.com/wired/archive/11.06/crowd_spc_pr.html, p. 153 (Jun. 2003).
Schoenharl et al. WIPER: Leveraging the Cell Phone Network for Emergency Response; Intl J of Intelligent Control and Systemns, vol. 0, No. 0; pp. 1-8 (Jan. 2007).
Vieira et al. Querying Spatio-Temporal Patterns in Mobile Phone-Call Databases; 11th IEEE Intl Conf. on Mobile Data Management (MDM), pp. 1-10 (May 23, 2010).
Horanont et al. An Implementation of Mobile Sensing for Large-Scale Urban Monitoring; UrbanSense08, Raleigh, NC, USA; pp. 51-55 (Nov. 4, 2008).
Giradin et al. Towards estimating the presence of visitors from the aggregate mobile phone network activity they generate., In 11th Intl Conf. on Computers in Urban Planning and Urban Management; pp. 1-11 (2009).

(Continued)

*Primary Examiner* — Hugh Jones
(74) *Attorney, Agent, or Firm* — Hartman & Citrin LLC

(57) ABSTRACT

Systems, methods, and computer program products are for estimating crowd size at a location. An exemplary method includes determining, at a crowd size analyzer, a number of wireless service users at the location, and estimating, at the crowd size analyzer, a total number of people at the location based upon the number of wireless service users determined to be at the location.

20 Claims, 2 Drawing Sheets

(56) References Cited

OTHER PUBLICATIONS

Steuer et al. The Use of Positioning Supported Traffic Density Measurements to Assist Load Balancing Methods Based on Adaptive Cell Sizing; IEEE PIMRC, pp. 1-5 (2002).

Kumar et al.: The Use of Mobile Positioning Supported Traffic Density Measurements to Assist Load Balancing Methods Based on Adaptive Cell Sizing; IEEE PIMRC 2002; pp. 1-5.

Notice of Allowance mailed Jan. 11, 2013 in U.S. Appl. No. 12/791,463, 5 pp.

Office Action mailed Oct. 3, 2012 in U.S. Appl. No. 12/791,463, 29 pp.

Kumar et al., "Forecasting Category Sales and Market Share for Wireless Telephone Subscribers: A Combined Approach"; International Journal of Forecasting 18 (2002) 583-603.

* cited by examiner

SYSTEMS, METHODS, AND COMPUTER PROGRAM PRODUCTS FOR ESTIMATING CROWD SIZES USING INFORMATION COLLECTED FROM MOBILE DEVICES IN A WIRELESS COMMUNICATIONS NETWORK

This application is a continuation of U.S. patent application Ser. No. 12/791,463, filed Jun. 1, 2010, now U.S. Pat. No. 8,442,807.

TECHNICAL FIELD

The present disclosure relates generally to crowd size estimation and, more particularly, to systems, methods, and computer program products for estimating crowd sizes using information collected from mobile devices in a wireless communications network.

BACKGROUND

Crowd size estimation is an important issue for event organizers, law enforcement, urban planners, and news media, among others, who want accurate estimates of crowd size at a specific time and location. For example, organizers may want accurate estimates of turnout to demonstrate support for their cause; law enforcement, which needs to optimally allocate critical resources to secure an event, may want accurate crowd size estimates to ensure that resources are allocated in the best and most cost effective manner; urban planners may use crowds size estimates to design improved solutions for handling crowds in public spaces such as parks, sports venues, and the like; and news media may use crowd size estimates to report the attendance at an event.

Several methods for crowd estimation have been proposed with varying degrees of success. One such method uses aerial photographic analysis to estimate crowd sizes In the aerial photographic analysis method, a fixed-wing aircraft is used to take aerial photographs at an altitude of 2,000 feet or less. Photographs of the area are taken in strips using a digital camera with about sixty-percent overlap between successive pictures to allow stereoscopic viewing. An image resolution of about one foot per pixel is typically used. The photographs are then loaded in an image processing program and co-registered with a one-meter-resolution United States Geological Survey ortho-photo map—a perspective-corrected collage of aerial shots of the area with a uniform scale. A grid is then superimposed on the image. Units are classified by the apparent density of people per unit. A cross, dot or other marking is placed on each individual's head or shadow point. Each marking is counted or, if necessary, estimated to determine the number of people in each grid unit. An error is then calculated based upon the number of grid units divided by the degree of uncertainty about how many people each grid unit contains.

Aerial photographic analysis works under certain assumptions and conditions. Flying over the crowd during peak times requires an initial estimate of when that peak time occurs since photography is, by definition, a snapshot in time. The methods presented herein below provide continuous estimation for the duration of an event. Crowd estimation over time to find dynamic crowd size estimates may be critical for first responders and law enforcement to assess a volatile situation before it reaches a flash point. For example, a rapidly growing mob could raise an alert to local law enforcement and event organizers.

Aerial photographic analysis also requires conditions that permit the use of aircraft flying at a certain altitude. In contrast, the disclosed methods allow a system to remotely analyze data collected from cell phones of the participants using wireless performance metrics. Analysis of the collected data can be done after the fact in situations where the event was not advertised or promoted and aerial photography was not permitted or planned.

Another pitfall of aerial photographic analysis occurs if the event is geographically dispersed. In such situations, the cost of aerial analysis increases along with the costs of coordinating the measurement at multiple event sites. Moreover, this method requires pre-knowledge of the event sites and does not permit after-the-fact analysis of crowd sizes. The disclosed method is agnostic of the number of locations or pre-knowledge since the disclosed data collection method can be continuous. In some cases, enhanced metric collection may be needed and can be activated remotely as needed. Thus, the disclosed method addresses a significant gap in cases where event sites are geographically dispersed.

Crowd estimation using aerial photographic analysis requires some degree of technical skill and, if done incorrectly (e.g., low resolution, blurry, or otherwise unusable photographs), will adversely impact the crowd size estimates. In some cases, such as events at night or events held in restricted spaces, aerial photography may not be possible. The disclosed methods can be used to complement aerial photography analysis in addition to addressing cases in which aerial photography methods is not preferred or will not work due to low light levels, dispersed crowds, vegetation, terrain, or participants being inside building or temporary structures such as tents, port-a-potties, and the like.

The crowd size estimates provided by the disclosed method can reduce the errors in aerial estimates by improving the degree of uncertainty about how many people attended a particular event. The disclosed method provides another dimension to event attendance.

Other methods for crowd estimation exist and have their own constraints. For example, crowd estimation by ground-level surveillance video, also called detector-based analysis, is only accurate on a small scale. This method requires extensive image analysis algorithms and is not scalable to large crowds. This method requires management of complex issues such as motion detection, clustering, pixel change analysis, vanishing points, fractal analysis, perspective views, and video quality.

Another crowd estimation method uses measurements of dynamic flows across a monitored boundary. Several entry, exit, and intermediate points on a parade route are monitored and the rate of movement of people across the boundary line is measured. These are extrapolated over time to estimate a crowd size in attendance at the parade.

Yet another crowd estimation method uses crowd density and location segmentation. This method maps an event space into a series of segments and, based upon the dimensions of the segment, computes a packing density and, therefore, an attendance number for the event space. This method has been used to estimate the crowd size at New Year's Eve events at Times Square in New York City, N.Y.

Another crowd estimation method uses the amount of trash produced by attendees. This method arose from the days when ticker tape parades yielded measurable trash volumes. Trash production by modern era crowds is comparatively small. Crowd estimation by trash volume is no longer viable due to many error factors. Similar modern methods that exist monitor port-a-potty use and extrapolate from there to determine crowd size.

SUMMARY

The systems, methods, and computer program products described herein provide a unique way to leverage performance management (PM) databases and systems to create data mining applications that use crowd size estimates. The present disclosure describes ways to determine and quantify a relationship between a number of cell phone users in a given location and a total number of people at the location. The location may be host to an event such as a sporting event, parade, festival, concert, marathon, holiday celebration, and the like.

As described herein, an analytical model is constructed with population-specific parameters that take into consideration (1) wireless network performance data, (2) user data, and (3) transaction data to produce a count of users at the location. Call detail records (CDR) and signaling message analyses are used in implementation. Calibration and feedback are used to refine and improve the analytical model to incorporate any additional factors that may impact crowd size. A margin of error associated with an estimate is also computed.

As also described herein, a statistical model is constructed to determine the population parameters needed to solve the equations provided by the analytical model. Statistical analysis is used to model real-world applications to efficiently and reliably aid in understanding the relationship between a general population and a subset of the same with detectable cell phone service.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Crowd Size Estimation Architecture

Figure 1:
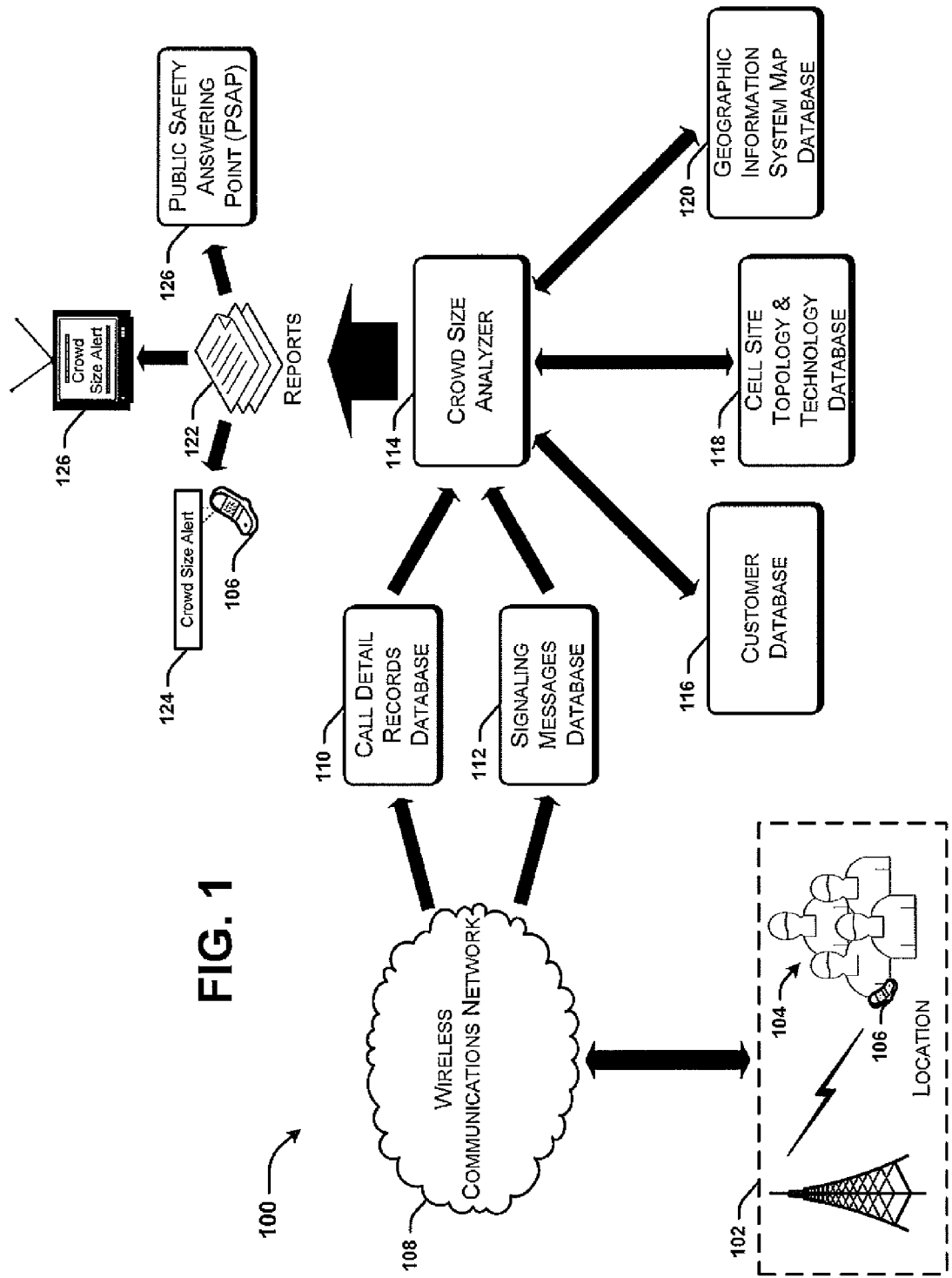
FIG. 1 schematically illustrates a crowd size estimation architecture, according to an exemplary embodiment of the present disclosure.

Referring now to the drawings in which like numerals represent like elements throughout the several views, FIG. 1 schematically illustrates a crowd size estimation architecture 100, according to an exemplary embodiment of the present disclosure. The crowd size estimation architecture 100 includes a location 102 in which a plurality of wireless service users ("crowd") 104 are located. Each user is associated with a mobile device 106 through which the user communicates with a wireless communications network 108 to carry out voice and/or data communications with other users within or outside the location 102.

As used herein, the term "user" may refer to users that subscribe to wireless service provided by an operator in accordance with a postpaid subscription plan or users that pre-pay to the operator for wireless service. Thus, the crowd may consist of exclusively postpaid users, exclusively prepaid users, or a combination of postpaid users and prepaid users.

In the illustrated embodiment, the wireless communications network 108 is a network provided by a single wireless service operator. As such, the wireless communications network 108 serves as the core or primary source of crowd size estimation data. In some embodiments, however, other operators may license or host similar sources to provide their crowd size estimation data based upon a proportional share of users to extrapolate to a total crowd size in the location 102.

In some embodiments, the wireless communications network 108 is configured to use exemplary telecommunications standards such as Global System for Mobile communications (GSM) and a Universal Mobile Telecommunications System (UMTS). It should be understood, however, that the wireless communications network 108 may alternatively be configured to use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

The illustrated wireless communications network 108 is in communication with a call detail record (CDR) database 110 and a signaling messages database 112. The CDR database 110 is a telecommunications performance management (PM) component configured to store CDRs generated by the wireless communications network 108 (e.g., generated by a charging system of the network 108). The signaling messages database 112 is a telecommunications control plane component configured to store signaling records from signaling operations of the wireless communications network 108.

CDRs, as used herein, may refer to call detail records that include information such as calling party number, called party number, date and time of call initiation, date and time of call termination, duration of call, number charged for call, identifier of the network component that generated the record, identifier of the record, result of the call (e.g., answered, busy, interrupted, and the like), call type (e.g., voice call, messaging, data), and any faults that occurred during the call.

Figure 2:
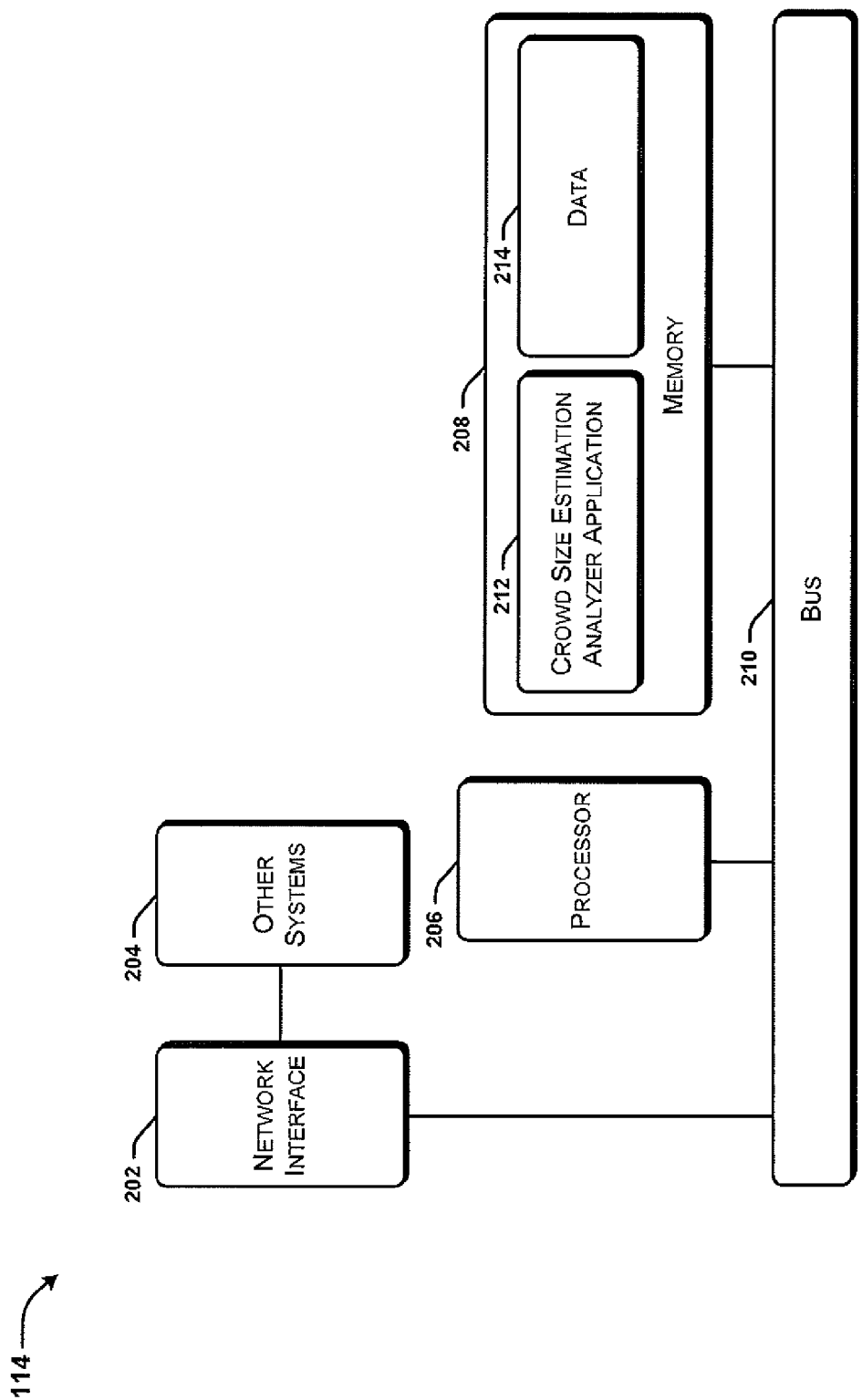
FIG. 2 schematically illustrates a crowd size analyzer and components thereof, according to an exemplary embodiment of the present disclosure.

The CDR database 110 and the signaling messages database 112 feed CDRs and signaling messages, respectively, into a crowd size analyzer 114. In one embodiment, the crowd size analyzer 114 is configured as a combination of hardware and software. The crowd size analyzer 114 includes an application configured to compute the crowd size based upon an analytical model of CDRs and signaling messages collected from the location 102 from a specified start time to a specified end time. The parameters of the analytical model are produced through statistical analysis of the mobile device user base, as described in more detail herein. An exemplary crowd size analyzer 114 and components thereof are illustrated in FIG. 2, described herein below. The crowd size analyzer 114 is also in communication with a customer database 116, a cell site topology and technology database 118, and a geographic information system (GIS) map database 120.

The customer database 116 is configured to store customer data. Customer data, in some embodiments, includes one or more of a mobile subscriber integrated services digital network number (MSISDN), an international mobile subscriber identity (IMSI), an international mobile equipment identity (IMEI), a home cell identifier, a work cell identifier, a home network identifier, a roaming network identifier, a most recent location, frequented locations, and the like. Customer data may alternatively or additionally include demographics such as sex, race, age, income, disabilities, education, home ownership, employment status, home address, work address, and other demographics. In one embodiment, the customer database 116 is configured to provide all or a portion of customer data to the crowd size analyzer 114 for statistical analysis using the statistical model described herein.

The cell site topology and technology database 118 is configured to store cell site information for at least a portion of the cell sites and associated components in the wireless communications network 108. In some embodiments, the cell site information includes information such as a location of at least some of the cell sites in the wireless communications network 108, the network components at the cell sites (e.g., base transceiver stations, node-Bs, base station controllers, and the like), the hardware version of the network components, the software version of the network components, the firmware version of the network components, and the like. In one embodiment, the cell site topology and technology database 118 is configured to provide all or a portion of the cell site information to the crowd size analyzer 114 to model the presence of one or more users at the location 102.

The GIS map database 120 is configured to store maps, such as ortho-photo maps, and latitude/longitude coordinates mapped to street addresses or other locations. In one embodiment, the GIS map database 120 is configured to provide the stored map, coordinate, and/or other location data to the crowd size analyzer 114 to model the location 102.

The crowd size analyzer 114 is configured to generate one or more crowd size reports 122, based on information received from the CDR database 110 and the signaling messages database 112. A crowd size report 122 is used to share a computed crowd size with various entities. In one embodiment, the crowd size analyzer 114 generates a crowd size report 122 for sending to mobile devices 106 used by members of the crowd 104. In some embodiments, the crowd size report 122 is formatted as a short messaging service (SMS) message, an enhanced messaging service (EMS) message, a multimedia messaging service (MMS) service, an unstructured supplementary service data (USSD), an email, an instant message, a forum message, a social networking message (e.g., Twitter® or Facebook®), and the like. The crowd size report 122 includes the crowd size computed by the crowd size analyzer 114 for the location 102. In some embodiments, the crowd size report 122 includes additional information such as demographic information provided by the customer database 116.

In another embodiment, the crowd size analyzer 114 generates a report 122 for delivery to a television 126 for audio and/or visual presentation to a viewer. In some embodiments, the report 122 is provided to the television 126 over-the-air or via a television service provider such as a cable, satellite, or Internet protocol television (IPTV) provider. In some embodiments, the report 122 is presented as audio, image, video, or some combination thereof. This information may be presented on the television 126 alone, audibly or visually superimposed, or in some other way to convey the crowd size information included in the crowd size report 122 to those that have an interest in receiving the crowd size information. The audio, image, or video data may be formatted by the television service provider, a broadcasting company, or other entity based upon the needs of a particular hosting entity. Moreover, the codecs (e.g., audio and/or video codecs) used to encode and decode report data may be any selected by the hosting entity.

In another embodiment, the crowd size analyzer 114 generates a report 122 for delivery to radio stations (not illustrated) for transmission via terrestrial radio towers, Internet, or satellite to those that have an interest in receiving the crowd size information.

In another embodiment, the crowd size analyzer 114 generates a crowd size report 122 for delivery to a public safety answering point (PSAP) 128. The PSAP 128 may deploy emergency services such as law enforcement, firefighters, and ambulance services to the location 102 in case of an emergency. Alternatively, the crowd size analyzer 114 generates a crowd size report 122 for delivery directly to emergency services personnel such as law enforcement, firefighters, and ambulance services located proximate the location 102.

In another embodiment (not illustrated), the crowd size analyzer 114 provides the report 122 to news outlets such as television news, news websites, and news web logs, message forums, social networking applications/websites, and the like.

Referring now to FIG. 2, the crowd size analyzer 114 and components thereof are illustrated, according to an embodiment of the present disclosure. Although connections are not shown between all components illustrated in FIG. 2, the components can interact with each other to carry out various system functions described herein. It should be understood that FIG. 2 and the following description are intended to provide a general description of a suitable environment in which the various aspects of some embodiments of the present disclosure can be implemented.

The crowd size analyzer 114 includes a network interface 202 for facilitating communications between the crowd size analyzer 114 and other systems 204 such as the CDR database 110, the signaling messages database 112, the customer database 116, the cell site topology and technology database 118, the GIS system map database 120, and other systems or components of the wireless communications network 108. The crowd size analyzer 114 also includes one or more processors 206 that are in communication with one or more memory modules 208 via one or more memory/data busses 210. The processor(s) 206 is configured to execute instructions of a crowd size estimation analyzer application 212 stored on a tangible, non-transitory computer-readable medium, such as the memory module(s) 208, to facilitate computations of crowd size based upon an analytical model using CDRs and signaling messages collected from the location 102 from a specified start time to a specified end time.

The term "memory," as used herein to describe the memory module(s) 208, collectively includes all memory types associated with the crowd size analyzer 114 such as, but not limited to, processor registers, processor cache, random access memory (RAM), other volatile memory forms, and non-volatile, semi-permanent or permanent memory types; for example, tape-based media, tangible optical media, solid state media, hard disks, combinations thereof, and the like. While the memory module(s) 208 is illustrated as residing proximate the processor(s) 206, it should be understood that the memory module(s) 208 is in some embodiments a remotely accessible storage system. Moreover, the memory module(s) 208 is intended to encompass network memory and/or other storage devices in wired or wireless communication with the crowd size analyzer 114. The memory module(s) 208 may also store other data 214, which may include cached customer information, cell site information, map/location information, signaling messages, CDRs, and the like.

Crowd Size Estimation Statistical Model Overview

A statistical model is used to aid in making crowd size estimations based upon information fed into the crowd size analyzer 114. The statistical model is used to determine the population parameters needed to solve the equations set forth by the analytical model, described later herein. Statistical variables used by the statistical model are illustrated below in Table A.

TABLE A

| Variable | Definition |
|---|---|
| U | The overall population of users and non-users. This may be a nationwide number or a specific sub-population, such as the population of single state or city. The statistical model will estimate the percentage of detectable mobile device users for this population. |
| $U_s$ | A sample population of users. |
| W | A discrete random variable used to count the number of users with mobile devices. An output of market research. |
| $W_d$ | A discrete random variable representing the number of users with mobile devices that are that are detectable by the wireless communications network. An output of the analytical model in controlled settings. |
| $\mu = E(W_d) = \Sigma x \times P(x)$ | The expected value of the number of users with mobile devices that is detectable by the wireless communications network. |
| $\sqrt{V(W_d)} = \sqrt{\Sigma(x-\mu)^2 \times P(x)}$ | The standard deviation of the number of users with mobile devices that is detectable by the wireless communications network. |
| $C_0, C_1, C_2, \ldots, C_n$ | The wireless operators providing service at a particular location. $C_0$ represents the population without wireless service. |
| $r_0, r_1, r_2, \ldots, r_n$ $\Sigma_{i=0}^n r_i = 1$ | The market share percentage of wireless service provider $C_i$ compared to the total population. $r_0$ is the proportion of people with no wireless service. These are outputs of market research and analysis in the region/area/market in which the monitored location resides. |
| $\alpha_w = \dfrac{\mu}{|U|}$ | The proportion of users with detectable wireless service in the overall population, U. |
| $N_{C_i} = |U_s| \times r_i \times \alpha_w$ | The expected number of users with detectable wireless service from wireless operators $C_i$ in the sample population, $U_s$. |
| E | Overall error factor. |

Calibrating the Statistical Model

The statistical model may need calibration from time to time for successful estimation of crowd size. The statistical model uses sampling distributions of a sample proportion of users with detectable mobile devices in the overall population to correlate multiple random samples of a specific size from a population and to provide population parameters. Using the central limit theorem (CLT), it is determined that the sampling distributions will be approximately normally distributed. The overall proportion of users with detectable wireless service, $\alpha_w$, can be inferred with high confidence from the sample statistics.

In one embodiment, calibration is accomplished through sampling and analysis at locations where near-exact crowd estimates are available. In addition or in the alternative, calibration is based upon industry data and market research relating to operator coverage and wireless subscribers, per operator, segmented by geography.

Sampling in controlled environments such as football stadiums, amusement parks, and other event locations with turnstiles or other attendee counting systems at an entry location can provide accurate crowd counts for a known population that can be surveyed or sampled for wireless usage. It can be determined based upon this information how many users have wireless service, or, for each operator providing service, how many users in the sample receive service from a specific operator. Cell sites of the wireless communications network 108 operating in the location 102 are monitored and the analytical model (described below) is implemented by the crowd size analyzer 114 to determine the number of mobile devices that are detectable in the location 102. The model can be tuned or re-calibrated multiple times as needed to reduce estimation errors.

Margins of error are estimated by comparing the analysis at a football stadium, for example, to market research on carrier coverage and subscriber penetration. The estimation process has many potential sources of error, each of which must be captured in the overall margin of error. Residual errors can be computed to show margins of errors between controlled environments and environments analyzed by the crowd size analyzer 114.

Crowd Size Estimation Analytical Model Overview

The analytical model includes several components that must be correctly captured to provide accurate crowd size estimation. These include an events component, a locations component, an attendee component, a subscriber component, a baseline component, and an error component.

Multiple operators may provide wireless service at the location 102. Each operator provides wireless service to a portion or subset of the wireless service user base. The portion of wireless users associated with each operator is in some embodiments represented as a percentage. As such, in some embodiments, the analytical model considers wireless service users with service from all operators serving the location 102. In these embodiments, an instance of the crowd size analyzer 114 may be used by each operator. In one embodiment, each crowd size analyzer instance feeds into a master crowd size analyzer (e.g., the illustrated crowd size analyzer 114) located in a host network. The master crowd size analyzer may be accessible by the operators via a data network such as an intranet or the Internet. In one embodiment, each crowd size analyzer instance feeds into a third party system that is external to the operator networks.

If all operators serving the location 102 do not support a crowd size analyzer instance, the analytical model is only able to count a subset of mobile device users that use wireless service provided by a participating operator, This reduces the overall accuracy of crowd size estimations. That is, as the number of participating operators approaches the total number of operators serving the location 102, the overall accuracy of crowd size estimations increases. However, for reasons, financial or otherwise, operators may elect not to participate in crowd size estimation. As such, the analytical model is configured to proportionately estimate the remaining users using the statistical model described above, at the expense of a potentially higher margin of error based upon, for example, the availability and/or accuracy of market research data of operator subscriber penetration in the location 102, among other factors. Variables used by the analytical model are illustrated below in Table B.

TABLE B

| Variable | Definition |
|---|---|
| $s_{i,j}, 1 < i, j < n$ | The number of unique $C_j$ subscribers detected at the location by wireless operator $C_i$ using the disclosed method, i.e., output of the analytical model run by wireless operator $C_i$ using CDRs and signaling messages from the operator's network only. If i = j, then the subscribers are home subscribers. Otherwise, the subscribers are roaming subscribers. |
| $S_i = \sum_{j=1}^{n} S_{ij}$ | The number of unique subscribers detected at the location for carrier $C_i$ by all carriers. |
| $N_w = \sum_{j=1}^{n} S_i$ | The number of people in attendance with detectable mobile devices shown as the final output of the analytical model using CDRs and signaling messages. |
| $\varepsilon_i = r_i - \dfrac{S_i}{N_w}$ | The residual error where the analytical and statistical models differ on the market share versus proportion of actual attendance at the location. If this is relatively large for the location (e.g., a specific event held at the location), the population is not representative of the statistical model. |
| $\alpha_w = \dfrac{\mu}{|U|}$ | The proportion of people in attendance with detectable mobile devices. An output of the statistical model to calibrate the parameter used in the analytical model. |
| $W = \dfrac{N_w}{\alpha_w} \pm E$ | The number of people in attendance. This is the crowd size to be determined. |

Profile of an Event Attendee and Wireless Service User

Generally, there is a high likelihood that through the duration of monitoring the location 102, an operational mobile device (i.e., a mobile device that has sufficient remaining battery capacity to be powered-on and attach to the wireless communications network 108) will be recognized at some point by a radio access component or other component of the wireless communications network 108. Although wireless service coverage in the location 102 may be intermittent or relatively poor, unless service is unavailable, the mobile device will be detected by the network 108.

When a wireless service user attaches to the wireless communications network 108 via a mobile device, such as the illustrated mobile device 106, the MSISDN, IMEI, and/or IMSI associated with the user is registered in a performance metric collected by the wireless communications network 108 in the location 102. The user's mobile device may be detected using network probes installed in one or more components of the wireless communications network 108 including, but not limited to, radio access network components, packet core, and circuit core components of the wireless communications network 108. In addition or in the alternative, the user's mobile device may be detected using CDR analysis, call setup signaling message analysis, call transfer signaling message analysis, call termination signaling message analysis, data session initiation, short messaging service (SMS) messaging activity, other messaging activity (e.g., multimedia messaging service (MMS)), packet data protocol (PDP) context requests, and/or other control plane activity. The most recent instance when a mobile device was detected at the location 102 may also be recorded and used/not used based upon the time frame during which the crowd size is monitored.

Modeling Events and Locations

An event may occur on a single date or a series of consecutive or non-consecutive dates. Moreover, a event may occur during non-consecutive times, such as different time ranges on the same day (e.g., 9-11 AM and 3-5 PM on the same day), and one or more time ranges on one day and one or more time ranges on another day. An event may occur at a single location such as the illustrated location 102, or in multiple, geographically dispersed locations. Each event location may have a start time and an end time for the event that defines the duration of the event. Activities scheduled to occur during the event may similarly include start and end times. The start and/or end times may include a time window, the times of which identify flexible, potential start times or end times. Additional time (e.g., seconds, minutes, hours, days, or other time increment) may be added to or subtracted from the start and/or end times to advance, postpone or otherwise reschedule the event or one or more activities during an event due to inclement weather, natural disaster, terrorist attacks, fires, organizer preference, attendee preference, or other occurrence that warrants rescheduling of the event or event activities. In some embodiments, the crowd size analyzer 114 is configured to begin analysis at a time prior to the start of an event and/or end analysis at a time after the event.

In some embodiments, the system 100 is configured to allow assignment of a criticality level to an event by an operator, news organization, event organizer, event attendee, government, business, individual, or third party. In some embodiments, the criticality level of an event is associated with a scale indicating various levels of criticality. Exemplary scales include written or verbal scales defined by terms such as critical, major, minor, and like terminology, color scales wherein different colors represent different criticality levels, and numeric scales wherein different numbers represent different criticality levels. Other scale types are contemplated. The criticality level aids the crowd size analyzer 114 in determining a level of analysis that is appropriate for a given event at a given location. The criticality level may be directly proportional to the accuracy of crowd size estimation needed in a particular situation. For example, certain events, such as a presidential inauguration, require high accuracy and thus could be assigned a critical or highest criticality level. In some embodiments, the crowd size analyzer 114 is configured to affect distribution of crowd size estimations, such as to whom and when (e.g., how often and how close to real-time), and by which channels, based upon the criticality level.

Each location in which an event can be held may include a list of operators that provide service in that location. Each operator has a map of cell tower topology depicting service availability at that location. These maps include latitude/longitude coordinates for each cell site. These maps are stored in the cell site topology and technology database 118 or similar database in each carrier's network or remote to each carrier for individual or collective access by the carriers. It is contemplated that one or more operators may share a cell site topology and technology database 118. The technology (e.g., GSM, UMTS, LTE, etc.) of each cell site, the frequency on which the cell tower communicates, and the sector geometry may also be stored in the database 118. Each location may also have a baseline of presence associated therewith. This represents the number of people that, under normal operating conditions, are present at the location when no event is scheduled. Such persons include those that live in or within a predetermined proximity of the event location, through traffic, persons arriving at the event location before the event is scheduled to begin, and persons in the event location during off-times (i.e., no event taking place). Events may impact the baseline of presence positively or negatively and adapt the baseline over time. Determination and use of baselines is described in additional detail below.

A map, such as an ortho-photo map of the terrain, is associated with each location. These maps are stored in the GIS map database 120 which, similarly, may be included in each operator's network or remote to each operator for individual or collective access by the operators. It is contemplated that one or more operators may share a map database 120.

Modeling Attendees and Baselines for Non-Event Related Activity at a Location

Each wireless service user is associated with an MSISDN, an IMEI, and an IMSI by the operator serving that user. This information is stored in association with the user's name and other information such as physical address, email address, alternate contact number (e.g., home telephone number), and/or other information, in the customer database 116. Each user can be identified by their MSISDN, IMEI, or IMSI.

Each user may be associated with an arrival time (i.e., the time at which a user's mobile device 106 is recognized within the location 102) and a departure time (i.e., the time at which a user's mobile device 106 is no longer recognized within the location 102). Determination or recording of the departure time may be time-buffered to allow mobile devices 106 to reattach to the wireless communications network 108 in the event signal is temporarily lost or otherwise interrupted. For example, if a mobile device 106 drops connection to a cell tower (e.g., BTS, node-B) within the location 102, a departure time will not be recorded for the mobile device 106 through the duration of a time buffer to allow the mobile device 106 an opportunity to reattach. Alternatively, the departure time may be reset or adjusted if the same mobile device 106 reappears in the location 102 at a later time. Devices 106 that leave and return may have multiple arrival and departure times or be flagged as having such and adjusted to record the earliest/latest of the arrival time and the earliest/latest of the departure time based upon the needs of a particular analysis.

The arrival time(s) and departure time(s) are used to determine a duration or time-spent-at-event. If an event occurs in multiple locations, an arrival/departure time(s) and duration may be recorded for each location the user attends.

In some embodiments, the crowd size analyzer 114 recognizes a defined role for each person at the event. Each uniquely identified user is tagged as, for example, an event visitor or an event non-visitor. Event non-visitors include persons that lives in proximity or otherwise typically use their mobile devices to attach to a cell tower in the event location, law enforcement, firefighters, emergency personnel (e.g., doctors, nurses, EMTs), media personnel, event organizers, and event workers.

A person could be transiting through the event location by plane, boat, car, motorcycle, or other mode of transportation. In some embodiments, the model detects this by flagging short duration at the event location or by cell tower handoff rates. Parameters may be defined for short duration visits to account for through traffic.

Each person in the statistical model is associated with a wireless carrier even while roaming. The wireless carrier for each person may be recorded for analysis.

Calibration of the model often includes computing a baseline for non-event related activity at the event location 102. Factors used for computing the baseline may include the number of people at the location 102 on a normal, non-event day, a particular day of the week, the number of workers at the location, the number of people that are non-event related visitors, the number of people in transit through the location 102, the number of actual event attendees at the location 102, and the coverage distribution among all carriers serving the location 102. After a baseline is computed, variance above and below the baseline can be measure for each attendee type—e.g., event or non-event attendee.

Statistical and Analytical Modeling Errors

Environments such as stadiums may not be representative of an actual event population due to poor signal within stadiums or other reasons. Accuracy of crowd estimation at these locations may be increased using turnstile entry numbers obtained from stadium personnel coupled with available unique cellular activity data obtained from the CDR database 110 and the signaling messages database 112.

The market share data and coverage data includes dynamic attributes that change often. Accordingly, the statistical model will be less accurate if it estimates parameters using historical market share and coverage data. Error correction factors may be used to mitigate these effects.

The assumption that the number of unique people is proportionate to the number of cell phones present may be impacted by demographics of the attendees. For example, an event that attracts a younger age demographic may trend to higher mobile device use and, thus, higher accuracy in terms of actual attendees vs. attendees with cell phones. Other demographic trends associated with income, race, religion, and the like may be indicative of a higher or lower propensity for mobile device use.

Detection errors may also be present in crowd size estimation computations. A false positive detection may occur when a user is identified as an event attendee even though they would not characterize themselves as such. A true negative may occur when a user did indeed attend an event but no PM metrics were collected from their mobile device 106, for example, due to their device 106 being in an inoperative state such as by not being powered-on or having a faulty radio transceiver. Error may also be attributed to attendees that simply cannot be detected. Examples include people without mobile devices 106, such as some children, people with mobile devices 106 in a power-off state, and people with poor or no service in the event location.

Other detection errors may be attributed to attendees that have two or more mobile devices 106 or if a single mobile device 106 has two or more records showing the same subscriber. Validation using the attendee's MSISDN, IMSI, or IMEI against the customer database 116 records may ensure that the attendee is counted only once.

The statistical model can be improved using calibration techniques described above and through the participation of multiple wireless operators. As described above, if all wireless operators providing service in the event location do not participate, additional error is introduced in estimating crowd size at the event location. Error correction factors based upon historical data and coverage penetration may be used to mitigate these effects.

Data Collection and Technical Issues

The disclosed systems and methods for computing crowd estimates assume that an event occurs at a location with adequate wireless service coverage. Locations that experience poor or no wireless service coverage are not likely to yield valid crowd size estimation results when analyzed.

Gaps in performance metrics may exist. In some embodiments, this is resolved by provisioning special data collection configurations (e.g., probes) on wireless communications network 108 components (e.g., radio access components, circuit core components, and packet core components) to collect performance data that would normally not be collected for analysis. In other embodiments, data collected from these special data collection configurations may be compared to data collected from the CDR database 110 and/or the signaling messages database 112 for redundancy of collected data or comparison analysis. In still other embodiments, new systems are deployed to count the number of unique subscribers accessing a particular cell site over a period of time. While this approach may be more accurate in certain locations that typically experience relatively lower accuracy crowd size estimations, the additional costs may be economically prohibitive for operators. The cost of the new systems may be subsidized by those requesting crowd size estimations.

The accuracy and precision of a location definition may be decreased due to inaccuracies in location determination techniques used to identify and define the event location. This may lead to the crowd size analyzer 114 falsely identifying non-attendees as attendees, and vice versa.

In some embodiments, the models are not be real-time models if CDRs and signaling messages needed for analysis are not aggregated in performance management business support systems. This may introduce a delay before analysis can proceed.

RF interference due to overcrowding may also affect analysis results. The crowd could potentially overwhelm the ability of operators to service all calls, resulting in dropped or missing data that introduces error to the analysis. This can be prevented by appropriate network engineering to support load at locations like the National Mall or other location wherein events frequently occur.

The tool used herein (e.g., the wireless communications network 108) to measure an event metric (e.g., crowd size at a location within the wireless communications network 108 is affected by the event it is monitoring. Thus, congestion and loss of performance data may lead to inaccuracies.

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, handheld computing devices, mobile devices, microprocessor-based consumer electronics, programmable electronics, network elements, gateways, network functions, devices, combinations thereof, and the like.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, comprising:
    determining, by a processor, a number of wireless service users at a location;
    estimating, by the processor, a total number of people at the location based upon the number of wireless service users determined to be at the location and based upon a statistical model; and
    calibrating the statistical model based upon market research relating to operator coverage in the location and a known number of wireless service users associated with each of a plurality of wireless service operators, at the location, by comparing the estimated total number of people at the location with the known number of wireless service users associated with each of the plurality of wireless service operators, at the location.

2. The method of claim 1, wherein determining the number of wireless service users at the location comprises determining the number of wireless users at the location based upon call detail record information.

3. The method of claim 1, wherein determining the number of wireless service users at the location is based upon signaling records associated with signaling operations of a wireless communications network.

4. The method of claim 1, wherein determining the number of wireless service users at the location is further based upon a received subset of the number of wireless service users at the location from a plurality of wireless service operators serving the location.

5. The method of claim 1, wherein estimating the total number of people at the location based upon the number of wireless service users determined to be at the location is further based upon an analytical model.

6. The method of claim 1, wherein determining the number of wireless service users at the location is further based upon network performance data.

7. The method of claim 6, wherein the network performance data is received from probes included on wireless network components of a wireless communication network.

8. A system, the system comprising:
    a processor; and
    a memory comprising instructions that, when executed by the processor, cause the processor to perform operations comprising:
        determining a number of wireless service users at a location;
        estimating a total number of people at the location based upon the number of wireless service users determined to be at the location by executing a statistical model; and
        calibrating the statistical model based upon market research relating to operator coverage in the location and a known number of wireless service users associated with each of a plurality of wireless service operators, at the location by comparing the estimated total number of people at the location with the known number of wireless service users, associated with each of the plurality of wireless service operators, at the location.

9. The system of claim 8, wherein the memory further comprises instructions that, when executed by the processor, cause the processor to perform determining the number of wireless service users at the location based upon call detail record information.

10. The system of claim 8, wherein the memory further comprises instructions that, when executed by the processor, cause the processor to perform determining the number of wireless service users at the location based upon signaling records associated with signaling operations of a wireless communications network.

11. The system of claim 8, wherein the memory further comprises instructions that, when executed by the processor, cause the processor to perform determining the number of wireless service users at the location based upon a received subset of the number of wireless service users at the location from a plurality of wireless service operators serving the location.

12. The system of claim 8, wherein the memory further comprises instructions that, when executed by the processor, cause the processor to perform estimating the total number of people at the location based upon the number of wireless service users determined to be at the location based upon an analytical model.

13. The system of claim 8, wherein the memory further comprises instructions that, when executed by the processor, cause the processor to perform determining the number of wireless service users at the location based upon network performance data.

14. The system method of claim 13, wherein the network performance data is received from probes included on wireless network components of a wireless communication network.

15. A non-transitory computer-readable storage medium comprising computer-executable instructions that, when executed by a processor, cause the processor to perform operations comprising:
   determining a number of wireless service users at a location;
   estimating a total number of people at the location, based upon the number of wireless service users determined to be at the location, by executing a statistical model; and
   calibrating the statistical model based upon market research relating to operator coverage in the location and a known number of wireless service users associated with each of a plurality of wireless service operators, at the location by comparing the estimated total number of people at the location with the known number of wireless service users, associated with each of the plurality of wireless service operators, at the location.

16. The non-transitory computer-readable storage medium of claim 15, further comprising instructions that, when executed by the processor, cause the processor to perform determining the number of wireless service users at the location based upon call detail record information.

17. The non-transitory computer-readable storage medium of claim 15, further comprising instructions that, when executed by the processor, cause the processor to perform determining the number of wireless service users at the location based upon signaling records associated with signaling operations of a wireless communications network.

18. The non-transitory computer-readable storage medium of claim 15, further comprising instructions that, when executed by the processor, cause the processor to perform determining the number of wireless service users at the location based upon a received subset of the number of wireless service users at the location from the plurality of wireless service operators serving the location.

19. The non-transitory computer-readable storage medium of claim 15, further comprising instructions that, when executed by the processor, cause the processor to perform estimating the total number of people at the location based upon the number of wireless service users determined to be at the location based upon an analytical model.

20. The non-transitory computer-readable storage medium of claim 15, further comprising instructions that, when executed by the processor, cause the processor to perform determining the number of wireless service users at the location based upon network performance data.

\* \* \* \* \*